UNITED STATES PATENT OFFICE.

WILLIAM T. DAVIES, OF CLEVELAND, OHIO, ASSIGNOR TO THE PATTERSON-SARGENT COMPANY, OF CLEVELAND, OHIO, A CORPORATION OF OHIO.

COMPOSITION OF MATTER FOR COATING PURPOSES.

1,205,976.  Specification of Letters Patent.  Patented Nov. 28, 1916.

No Drawing.   Application filed July 7, 1916.  Serial No. 107,912.

*To all whom it may concern:*

Be it known that I, WILLIAM T. DAVIES, a citizen of the United States, residing at Cleveland, in the county of Cuyahoga and State of Ohio, have invented certain new and useful Improvements in and Relating to Composition of Matter for Coating Purposes, of which the following is a specification.

This invention relates to a composition of matter to be used as a paint, more particularly as a paint for the protection and coloring, either or both, of surfaces exposed to the elements, water or other influences which cause or tend to cause deterioration thereof. The invention is especially adapted for application to metal surfaces, such as iron and steel.

One object of the invention is to produce an improved composition of matter of this character the ingredients of which are substantially incapable of saponifying, settling or becoming hard.

Another object of the invention is to produce an improved composition of matter of this character in which all the ingredients chemically unite to maintain the ingredients in suspension for substantially an indefinite period.

Another object of the invention is to produce a composition of matter of this character in which the ingredients are so compounded and chemically combined as to form a body of liquid paint of substantially uniform consistency throughout capable of being evenly and uniformly applied to a surface without sagging or streaking.

Another object of the invention is to produce a composition of matter adapted to be readily applied to a surface to form a durable, tough, impervious coating thereon.

My composition of matter consists of the following ingredients, combined, by mixing, stirring, thorough grinding and agitating, in any well known manner, into substantially a homogeneous body in approximately the proportions stated below: red lead ($Pb_3O_4$) 457 lbs., magnesium silicate ($3MgO.4SiO_2.H_2O$) 228 lbs., oxid of iron ($Fe_2O_3$) 15 lbs., calcium sulfate ($CaSO_4$) 6 lbs., calcium carbonate ($CaCO_3$) 50 lbs., linseed oil 285 lbs., drier (japan) 30 lbs. These ingredients chemically unite with each other in such manner that they remain in suspension without saponifying for substantially an indefinite period, so that the composition can be manufactured or conditioned ready for use and put in receptacles, such as cans, which can then be sealed and sold or shipped to distant points, thus insuring economy of labor and time on the one hand and on the other a uniform quality and condition of product at all times; in other words each can or receptacle of paint at the time of use, irrespective of the length of time since it was manufactured, has the same body consistency and composition as every other can or batch, so that evenness of application and the same thickness of coat may at all times be applied.

It will thus be seen that in my invention the materials compounded and the relative proportions thereof adopted are such that they chemically combine to form a substantially homogeneous, ready-for-use, liquid composition that does not saponify or become hard while being stored prior to use, nor sag or streak during application to surfaces.

Heretofore, paint compositions, in which red lead was used as a pigment, have usually been sold in powdered or paste form, so that at the time of use they had to be mixed or thinned, according to their condition. Many objections were found to exist when paint was sold in either of these forms. Not only was much time required to condition the material for use, but it was impossible to thoroughly mix or incorporate the reducing oil into the powder or paste to make a proper, uniformly mixed liquid paint. Again, each batch of paint differed in the proportions of the materials used, its consistency, as well as its quality, so that uniformity of the paint mixture and evenness of application on a surface could not be secured. By my invention I have been able to overcome all these disadvantages, and at the same time to provide a ready-for-use composition that is substantially homogeneous, thereby insuring uniformity as to quality and condition and evenness of application thereof to any surface, as well as a coating of a definite thickness capable of effectively protecting the surface to which it is applied.

By my present invention, I produce a paint composition that is particularly applicable to metal surfaces, hulls of ships and the like, for protective and coloring purposes.

When applied in an ordinary manner to a surface, my improved composition of matter forms thereon a durable and relatively hard coating that is substantially impervious to the elements and water.

What I claim is:

1. The herein described composition of matter, comprising red lead, magnesium silicate, oxid of iron, calcium sulfate, calcium carbonate, linseed oil and a suitable drier.

2. The herein described composition of matter comprising 457 parts of red lead, 228 parts of magnesium silicate, 15 parts of oxid of iron, 6 parts of calcium sulfate, 50 parts of calcium carbonate, 285 parts of linseed oil and 30 parts of suitable drier.

In testimony whereof I affix my signature, in the presence of two witnesses.

WILLIAM T. DAVIES.

Witnesses:
 P. R. KITTINGER,
 F. E. PERKINS,